(12) United States Patent
Arisawa et al.

(10) Patent No.: US 7,821,322 B2
(45) Date of Patent: *Oct. 26, 2010

(54) CHIP FOR NON-CONTACT READER/WRITER HAVING POWER-SUPPLY MANAGEMENT FUNCTION

(75) Inventors: Shigeru Arisawa, Tokyo (JP); Akihiko Yamagata, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/470,035

(22) Filed: May 21, 2009

(65) Prior Publication Data

US 2009/0237144 A1    Sep. 24, 2009

Related U.S. Application Data

(63) Continuation of application No. 10/258,651, filed as application No. PCT/JP02/01945 on Mar. 4, 2002, now Pat. No. 7,554,383.

(30) Foreign Application Priority Data

Mar. 2, 2001    (JP)    ............... P2001-059284

(51) Int. Cl.
*G11C 5/14*    (2006.01)
(52) U.S. Cl. ............... 327/530; 327/544; 307/80; 307/81
(58) Field of Classification Search ............... 327/530, 327/531, 533, 544; 307/80, 81
See application file for complete search history.

(56) References Cited

U.S. PATENT DOCUMENTS

| | | | |
|---|---|---|---|
| 4,441,031 A * | 4/1984 | Moriya et al. | ............... 307/66 |
| 5,943,624 A | 8/1999 | Fox et al. | |
| 6,198,361 B1 | 3/2001 | Arisawa | |
| 6,313,548 B1 * | 11/2001 | Kurimoto | ............... 307/43 |
| 6,560,082 B1 * | 5/2003 | Arisawa | ............... 361/84 |
| 6,847,131 B2 * | 1/2005 | Nakamura | ............... 307/66 |
| 7,554,383 B2 * | 6/2009 | Arisawa et al. | ............... 327/530 |

FOREIGN PATENT DOCUMENTS

| | | |
|---|---|---|
| EP | 0 849 703 A2 | 6/1998 |
| GB | 2 292 866 | 3/1996 |
| JP | 4-241085 A1 | 8/1992 |
| JP | 6-61993 A1 | 3/1994 |
| JP | 6-124368 A | 5/1994 |
| JP | 195 31 625 A1 | 3/1996 |
| JP | 8-185497 A1 | 7/1996 |

(Continued)

*Primary Examiner*—Long Nguyen
(74) *Attorney, Agent, or Firm*—Lerner, David, Littenberg, Krumholz & Mentlik, LLP (57) ABSTRACT

A semiconductor integrated-circuit device rectifies a received carrier wave, generates a first power-supply voltage based on the rectified output, and selects, as a power-supply voltage required for operation, one of the first power-supply voltage and a supplied second power-supply voltage. The first power-supply voltage is selected as the power-supply voltage required for operation when the second power-supply voltage is lower than a threshold value. The second power-supply voltage is selected as the power-supply voltage required for operation when the second power-supply voltage is equal to or higher than the threshold value and an instruction to operate in accordance with a predetermined function is given.

12 Claims, 10 Drawing Sheets

FOREIGN PATENT DOCUMENTS

| | | |
|---|---|---|
| JP | 10-98542 A1 | 4/1998 |
| JP | 10-261053 A1 | 9/1998 |
| JP | 11-355367 A1 | 12/1999 |
| JP | 2000-184587 A1 | 6/2000 |
| JP | 2001-5920 A1 | 1/2001 |
| WO | 99/41714 A1 | 8/1999 |

* cited by examiner

| BATTERY | en | SW$_{en}$ |
|---------|-----|-----------|
| PRESENT | 1 | ON |
| ABSENT | 0 | OFF |

FIG. 7

| P_ON | VR | SW_cont | OPERATION OF CPU SYSTEM |
|---|---|---|---|
| 0 | 0 | OFF | DOES NOT OPERATE |
| 0 | 1 | ON | CARD MODE |
| 1 | 0 | ON | R/W MODE |
| 1 | 1 | ON | EXCLUSIVELY SELECT CARD MODE OR R/W MODE |

| $V_B$ | $P_{ON}$ | VR | SW | OPERATION OF CPU SYSTEM |
|---|---|---|---|---|
| 0 | 0 | 0 | OFF | DOES NOT OPERATE |
| 0 | 0 | 1 | OFF | DOES NOT OPERATE |
| 0 | 1 | 0 | OFF | DOES NOT OPERATE |
| 0 | 1 | 1 | OFF | DOES NOT OPERATE |
| 1 | 0 | 0 | OFF | DOES NOT OPERATE |
| 1 | 0 | 1 | ON | CARD MODE |
| 1 | 1 | 0 | ON | R/W MODE |
| 1 | 1 | 1 | ON | EXCLUSIVELY SELECT CARD MODE OR R/W MODE |

FIG. 10
(PRIOR ART)

CHIP FOR NON-CONTACT READER/WRITER HAVING POWER-SUPPLY MANAGEMENT FUNCTION

CROSS-REFERENCE TO RELATED APPLICATIONS

This application is a continuation of U.S. application Ser. No. 10/258,651, filed Apr. 8, 2003, which is a national phase entry under 35 U.S.C. §371 of International Application No. PCT/JP02/01945, filed Mar. 4, 2002, which claims priority from Japanese Application No. P2001-59284, filed Mar. 2, 2001, the disclosures of which are incorporated by reference herein.

BACKGROUND OF THE INVENTION

1. Technical Field

The present invention relates to a semiconductor integrated-circuit device. More particularly, the present invention relates to a semiconductor integrated-circuit device having incorporated therein analog front-ends for use with a data carrier and/or for use with an information processing apparatus for an external data carrier.

2. Background Art

Figure 10:
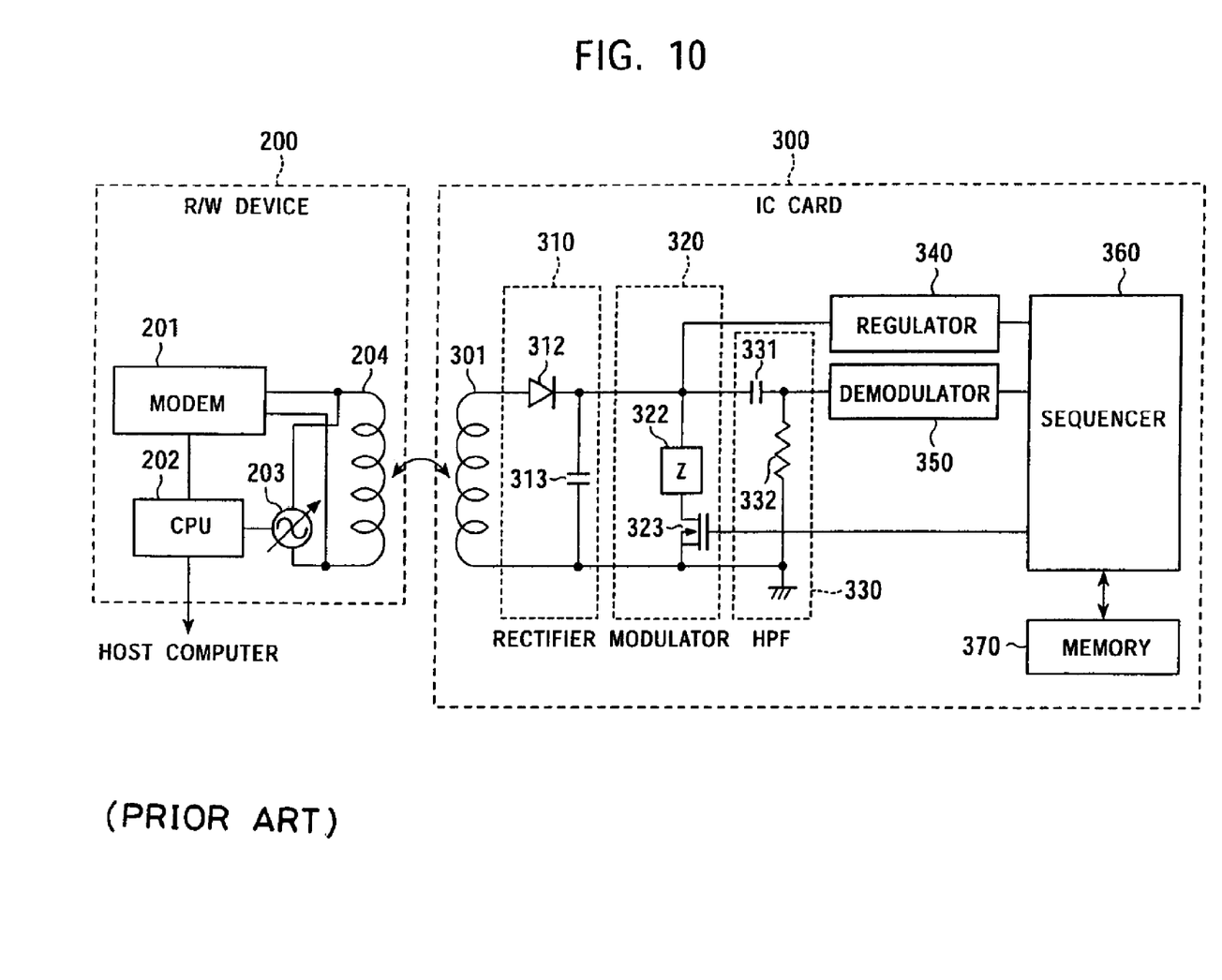
FIG. 10 shows an overall configuration of a conventional non-contact card and a reader/writer device for reading/writing the non-contact card.

A method in which a non-contact IC card is introduced into, for example, a railroad ticket gate system and is used when passing through the ticket gate has begun to be put into practical use. FIG. 10 shows an overall configuration of a non-contact IC and a reader/writer device for reading/writing this non-contact IC card. In FIG. 10, reference numeral 200 denotes a reader/writer (R/W) device, and reference numeral 300 denotes a non-contact IC card. Reference numeral 201 denotes a modem, reference numeral 202 denotes a CPU, reference numeral 203 denotes an oscillator, and reference numeral 204 denotes an antenna. Reference numeral 301 denotes an antenna, reference numeral 310 denotes a rectifier, reference numeral 312 denotes a diode, reference numeral 313 denotes a capacitor, reference numeral 320 denotes a modulator, reference numeral 322 denotes an impedance device, reference numeral 323 denotes an FET diode, reference numeral 330 denotes a high-pass filter (HPF), reference numeral 331 denotes a capacitor, reference numeral 332 denotes a resistor, reference numeral 340 denotes a regulator, reference numeral 350 denotes a demodulator, reference numeral 360 denotes a sequencer, and reference numeral 370 denotes a memory.

The R/W device 200 and the IC card 300 of FIG. 10 form a non-contact IC card system in which data is transmitted and received to and from each other via each antenna. In such a non-contact IC card system, the non-contact IC card 300 rectifies a carrier wave modulated in accordance with transmission data from the R/W device 200 in order to generate a DC voltage, and supplies the voltage as power for the internal CPU and circuits such as the memory. Specifically, the voltage rectified by the rectifier 310 is regulated to a predetermined voltage by the regulator 340, and is supplied to the sequencer 360. On the other hand, a signal received by the antenna 301 is demodulated by the demodulator 350 and is supplied to the sequencer 360, where a predetermined process is performed thereon. The processed data is recorded in the memory 370.

Furthermore, when responding to the R/W device 200, in the non-contact IC card 300, the data processed by the sequencer 360 is modulated by the modulator 320, and the data is transmitted from the antenna 301. The signal received by the antenna 204 of the R/W device 200 is demodulated by the modem 201, and the signal is processed by the CPU 202.

In such a non-contact IC card system, IC chips used in a non-contact IC card are formed into one chip by MOS processing, a carrier wave from an external reader/writer is rectified to generate a DC voltage, and the voltage is used as power for the internal CPU and circuits such as the memory.

On the other hand, a mobile communication device having a so-called IC card function, such as a data carrying and processing function, by incorporating an integrated circuit in a mobile communication device has been proposed. However, specific realizing means have not been made clear.

BRIEF SUMMARY OF THE INVENTION

The present invention has been made in view of the above-described problems. In a portable terminal device having an IC card function, a power supply obtained by rectifying a carrier wave and an external power supply are switched seamlessly, the power supply is installed in the portable terminal device, and a semiconductor integrated-circuit in which analog front-ends for both an IC card and an information processing apparatus such as a reader/writer are installed is realized.

The present invention provides a semiconductor integrated-circuit device comprising a semiconductor integrated-circuit device including rectifying means for rectifying a received carrier wave; generation means for generating a first power-supply voltage on the basis of an output by the rectifying means; and selection means for selecting one of the first power-supply voltage generated by the generation means and a supplied second power-supply voltage as a power-supply voltage required for operation, wherein the selection means selects the first power-supply voltage as a power-supply voltage required for operation when the second power-supply voltage is lower than a threshold value, and selects the second power-supply voltage as a power-supply voltage required for operation when the second power-supply voltage is equal to or higher than the threshold value and an instruction of operation in accordance with a predetermined function is given.

In a case where the second power-supply voltage is equal to or higher than a predetermined threshold value, the selection means may select the second power-supply voltage as a power-supply voltage required for operation when an instruction of operation in accordance with a data carrying and processing function for performing communication with an external information processing apparatus is given or when an instruction of operation in accordance with a function for performing communication with an external data carrying and processing medium is given.

A function section for realizing a data carrying and processing function, and a function section for performing communication with an external data carrying and processing medium may be formed by one chip.

The semiconductor integrated-circuit device may further comprise control means, disposed between a connection point of the rectifying means and the generation means and a grounding point, for controlling the switching of a switch in accordance with a signal instructing an operation in accordance with a function for performing communication with an external data carrying and processing medium. The control means may turn off the switch when the signal is supplied, and may prevent an inflow of leakage electrical current by the generation means, which occurs when the second power-supply voltage is selected, by the selection means, as a power-supply voltage required for operation.

The semiconductor integrated-circuit device may further comprise clock extraction means for extracting a first clock on the basis of the carrier wave; clock generation means for generating a second clock; and clock selection means for selecting, as a clock used as an operation reference, one of the first clock extracted by the clock extraction means and the second clock generated by the clock generation means. The clock selection means may select the first clock as a clock used as an operation reference when the first clock is extracted by the clock extraction means, and may select the second clock as a clock used as an operation reference when the first clock is not extracted by the clock extraction means.

The present invention provides a portable terminal device comprising a semiconductor integrated-circuit device including: rectifying means for rectifying a received carrier wave; generation means for generating a first power-supply voltage on the basis of an output by the rectifying means; and selection means for selecting one of the first power-supply voltage generated by the generation means and a supplied second power-supply voltage as a power-supply voltage required for operation, wherein the selection means selects the first power-supply voltage as a power-supply voltage required for operation when the second power-supply voltage is lower than a threshold value, and selects the second power-supply voltage as a power-supply voltage required for operation when the second power-supply voltage is equal to or higher than the threshold value and an instruction of operation in accordance with a predetermined function is given.

The present invention provides a settlement method for performing a settlement with a portable terminal device comprising rectifying means for rectifying a received carrier wave; generation means for generating a first power-supply voltage on the basis of an output by the rectifying means; selection means for selecting one of the first power-supply voltage generated by the generation means and a supplied second power-supply voltage as a power-supply voltage required for operation; and storage means for storing money information as a predetermined transaction price, the settlement method comprising a communication step of performing communication with the portable terminal device; a reading step of reading the money information stored in the portable terminal device in the process of the communication step; and a settlement step of performing a settlement on the basis of the money information read in the process of the reading step.

In the semiconductor integrated-circuit device of the present invention and in the semiconductor integrated-circuit device provided in a portable terminal device, a received carrier wave is rectified, a first power-supply voltage is generated on the basis of the output thereof, and one of the generated first power-supply voltage and the supplied second power-supply voltage is selected as a power-supply voltage required for operation. When the second power-supply voltage is lower than a threshold value, the first power-supply voltage is selected as a power-supply voltage required for operation. When the second power-supply voltage is equal to or higher than the threshold value and an instruction to operate in accordance with a predetermined function is given, the second power-supply voltage is selected as a power-supply voltage required for operation.

In the settlement method of the present invention, money information which is communicated with the portable terminal device and is stored in the portable terminal device is read, and a settlement is performed on the basis of the read money information.

DETAILED DESCRIPTION

Best Mode for Carrying Out the Invention

First Embodiment

Figure 1:
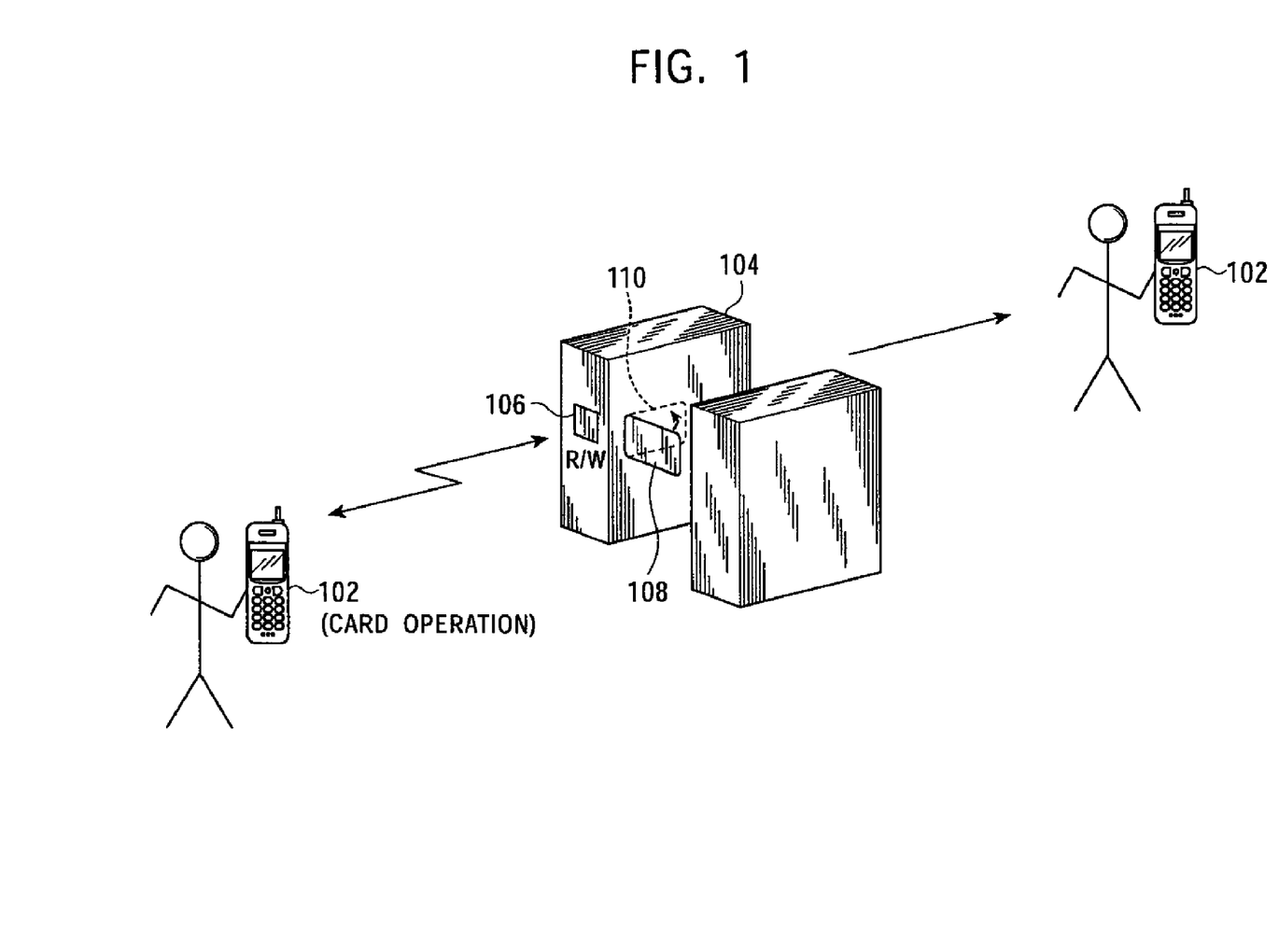
FIG. 1 is an overall diagram illustrating a ticket gate system in which a cellular phone of a first embodiment of the present invention is used as a non-contact card.

FIG. 1 is an overall diagram illustrating a ticket gate system in which a cellular phone of a first embodiment of the present invention is used as a non-contact card. In FIG. 1, reference numeral 102 denotes a cellular phone having a card operation function. Reference numeral 104 denotes a ticket gate provided in a station, etc. Reference numeral 106 denotes a reader/writer device having a reading/writing function, provided in the ticket gate 104. Reference numeral 108 denotes a closed ticket gate passing plate. Reference numeral 110 denotes an open ticket gate passing plate.

Next, the ticket gate system of FIG. 1 will be described briefly. A user, carrying the cellular phone 102, approaches the ticket gate 104. The reader/writer device 106 disposed in the ticket gate 104 detects that the cellular phone 102 of the user has reached the ticket gate 104 and performs communication with the cellular phone 102. When mutual authentication (for example, a settlement based on money information stored in the cellular phone 102) can be confirmed, the ticket gate passing plate 108 is driven, and the ticket gate passing plate 108 is opened as shown at reference numeral 110. This makes it possible for the user to pass through the ticket gate 104.

Figure 2:
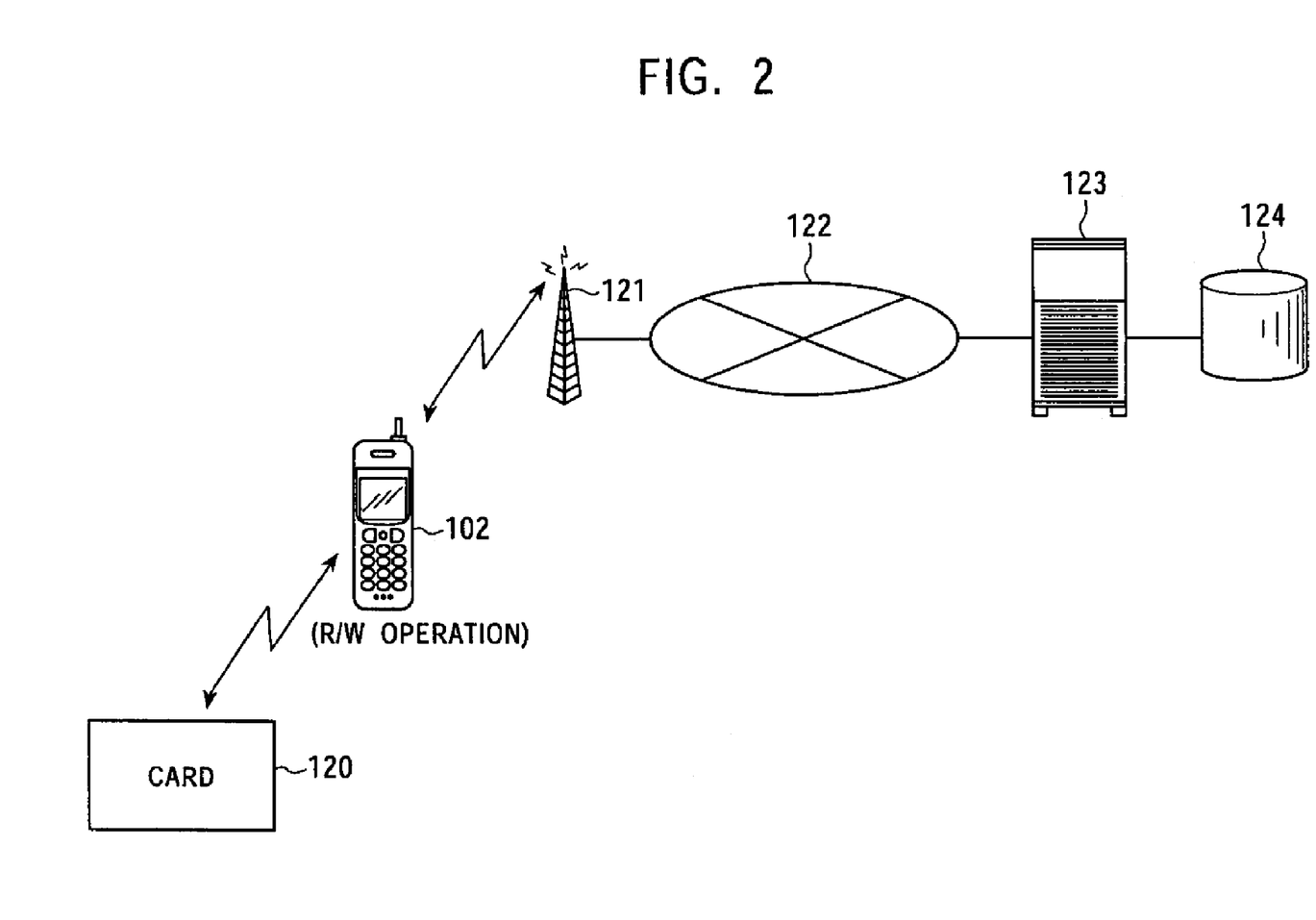
FIG. 2 is an overall diagram illustrating a ticket gate system in which a cellular phone of the first embodiment of the present invention is used as a reader/writer device.

FIG. 2 is an overall diagram illustrating a settlement system in which a cellular phone of the first embodiment of the present invention is used as a reader/writer device. In FIG. 2, reference numeral 102 denotes a cellular phone having a reading/writing function. Reference numeral 120 denotes a non-contact IC card. Reference numeral 121 denotes a base-station antenna. Reference numeral 122 denotes a mobile communication network. Reference numeral 123 denotes a control computer provided in the central site, etc. Reference numeral 124 denotes a data memory connected to the control computer 123.

Next, a reading/writing operation performed by the cellular phone 102 with the non-contact IC card 120 in the settlement system of FIG. 2 will be described briefly. For example, when an amount of boarding points recorded in the non-contact IC card 120 becomes small, the cellular phone 102 reads point information recorded in the non-contact IC card 120 in order to recognize the amount of the shortage. When the points recorded in the non-contact IC card 120 are insufficient, the cellular phone 102 accesses the control computer 123 via the base-station antenna 121 and the mobile communication network 122, obtains points therefrom, and writes the obtained points into the non-contact IC card 120 by using the reading/writing function.

Figure 3:
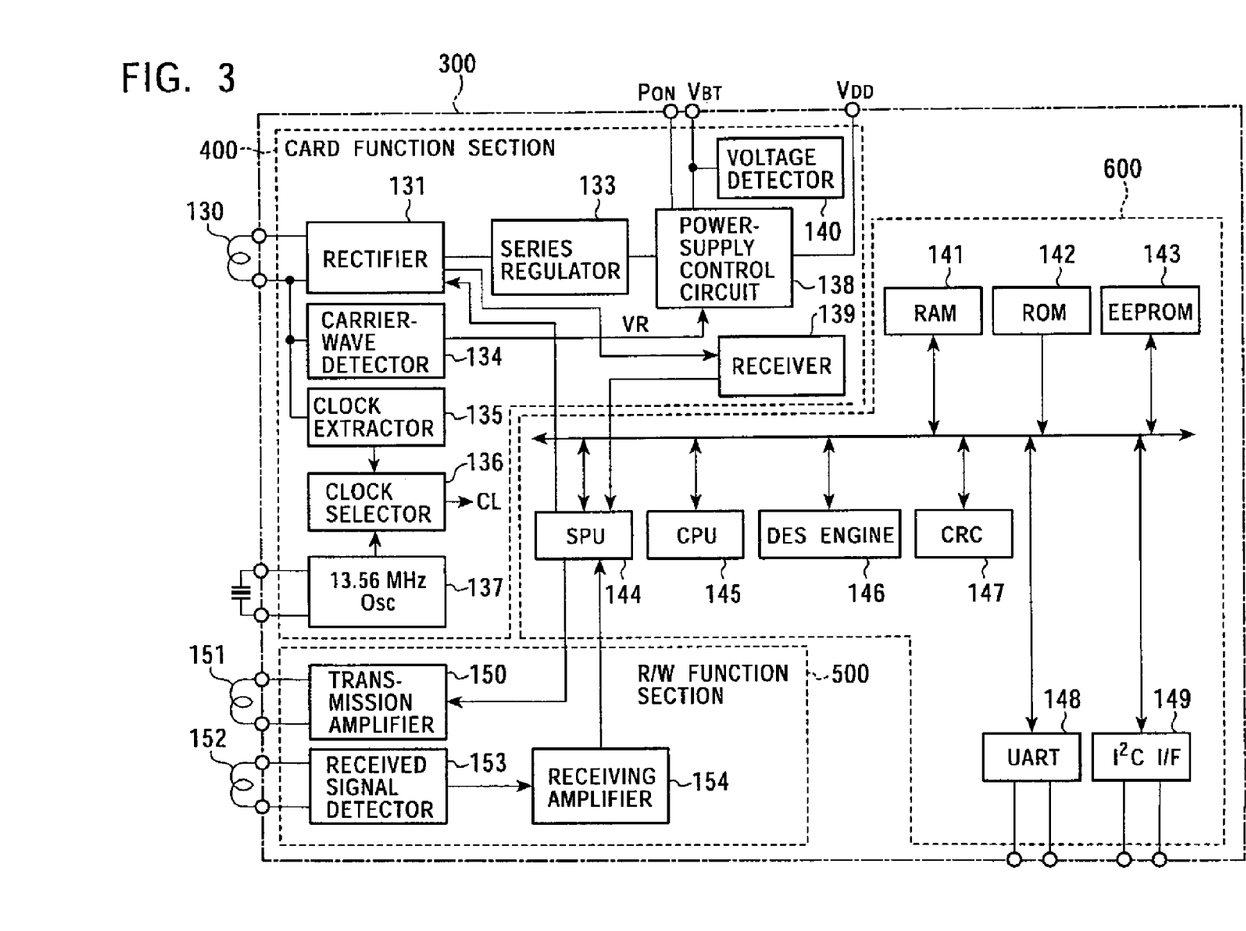
FIG. 3 shows a configuration of a cellular phone having a reading/writing function of the first embodiment of the present invention.

Next, a description is given of a configuration of the cellular phone 102 of the first embodiment of the present invention having the above-described reading/writing function. FIG. 3 shows an example of an internal configuration of an IC provided inside the cellular phone 102 according to the present invention having a reading/writing function. In FIG. 3, an IC 300 is formed of a card function section 400, a reading/writing function section 500, and a control section 600.

In the card function section 400, a carrier wave received by an antenna 130 is rectified by a rectifier 131, and this wave is output to a power-supply control circuit 138 via a series regulator 133. The power-supply control circuit 138 controls a voltage from the series regulator 133 and supplies a power-supply voltage (VDD) used in the entire IC 300. Here, the series regulator 133 is a device for making the output voltage substantially uniform regardless of the input voltage. That is, the power-supply control circuit 138 performs an operation such as that described above by increasing the internal impedance when the input voltage is high and by decreasing the internal impedance when the input voltage is low. A voltage detector 140 monitors the voltage of an external power supply (battery) connected to the power-supply control circuit 138, and outputs a signal for prohibiting the use of the external power supply to the power-supply control circuit 138 when the voltage of the external power supply falls below a predetermined voltage. A signal received from the external reader/writer is input via the rectifier 131 to a receiver 139, where the signal is converted into a baseband signal, and this signal is passed to a signal processing unit (SPU) 144 and is processed thereby. Furthermore, a transmission signal to the external reader/writer is passed from the SPU 144 to the rectifier 131, where the value of a load connected to the antenna 130 is changed according to the transmission signal, and amplitude modulation is performed on a carrier wave generated by the external reader/writer.

In a carrier-wave detector 134, it is determined whether or not a carrier wave is contained in the radio wave received by the antenna 130. When it is determined by the carrier-wave detector 134 that a carrier wave is contained, a carrier-wave detection signal VR is output from the carrier-wave detector 134 to the power-supply control circuit 138. A clock extractor 135 extracts a clock from the input radio wave input from the antenna 130 and supplies the extracted clock to a clock selector 136. A clock oscillator 137 causes a crystal vibrator provided outside the IC chip to generate a clock of a frequency (e.g., 13.56 MHz) used in the IC 300 and supplies the clock to the clock selector 136. The clock selector 136 selects one of the clock supplied from the clock extractor 135 and the clock supplied from the clock oscillator 137, and supplies the selected clock to all sections of the IC 300. The entire operation of the card function section 400 is controlled by a CPU 145 of the control section 600 (to be described later).

The reading/writing function section 500 comprises a transmission amplifier 150, a received-signal detector 153, and a receiving amplifier 154. The reading/writing function section 500 has a transmission and receiving function, causes the transmission amplifier 150 to amplify the transmission signal supplied from the SPU 144, and sends the resulting signal from an antenna 151. On the other hand, the signal received by an antenna 152 is detected by the received-signal detector 153 and is amplified by the receiving amplifier 154, and this signal is supplied to the SPU 144, where the signal is subjected to signal processing.

The control section 600 comprises a central processing unit (CPU) 145, a signal processing unit (SPU) 144, an encryption (DES) engine 146, a detector (CRC) 147 for detecting bit error, a primary memory (RAM) 141, a read-only memory (ROM) 142, an EEPROM 143 for recording data, a UART circuit 148 for performing asynchronous serial communication with an external source, and an I2C interface 149 for performing communication with the external source.

In the present invention, in the manner described above, since the card function section 400 and the reading/writing function section 500 are provided, the switching of the power supplies is controlled so that the most appropriate power supply is supplied to these sections. Furthermore, in the cellular phone, the antenna configuration used in the conventional IC card cannot be used as is, and an antenna in compliance with the cellular phone must be incorporated. Even in such a case, by supplying power to the IC card section (IC 300) from the battery, a sufficient power can be supplied.

The IC 300 has three operation modes: an external card mode in which communication with an external reader/writer device is performed via the card function section 400, a reader/writer mode in which communication with an external non-contact IC card is performed via the reading/writing function section 500, and an internal card mode in which an internal card disposed within is processed.

Figure 4:
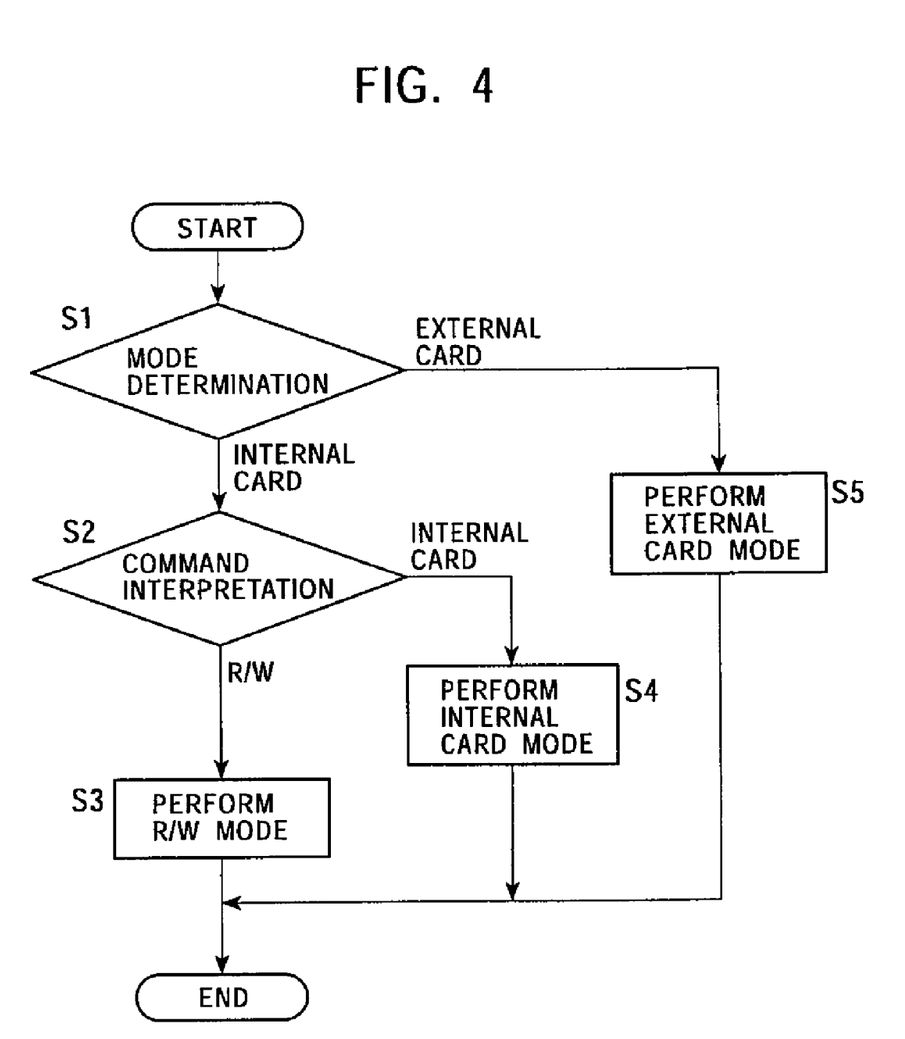
FIG. 4 shows a flowchart for selecting one of three operation modes of the cellular phone of the first embodiment of the present invention.

FIG. 4 shows a flowchart for selecting one of the above-described three operation modes. In FIG. 4, the CPU 145 performs mode determination in step S1. When the CPU 145 determines in step S1 that the mode is an external card mode, in step S5, the CPU 145 performs the external card mode which performs a card process with the external reader/writer device via the card function section 400. When the CPU 145 determines in step S1 that the mode is an internal card mode, in step S2, the CPU 145 performs command interpretation, and in the case of the internal card mode, a process for the card disposed within is performed. On the other hand, when the CPU 145 determines in step S2 that the mode is an R/W mode, the process proceeds to step S3, where a reader/writer mode is performed with an external non-contact IC card via the reading/writing function section 500.

The antennas for a card and for a reader/writer, or the transmission and receiving antennas for a reader/writer need not be separately provided, and one antenna may be used commonly.

In the present invention, the output (power generated from a carrier wave) of the power-supply control circuit 138 is supplied to a terminal VDD. On the other hand, the power from the battery is also supplied to the terminal VDD via the power-supply control circuit 138 in a similar manner. One of these two power supplies is selected according to a logical combination of a signal PON from the cellular phone (controller (not shown)) and a signal VR from the carrier-wave detector 134.

Figure 5:
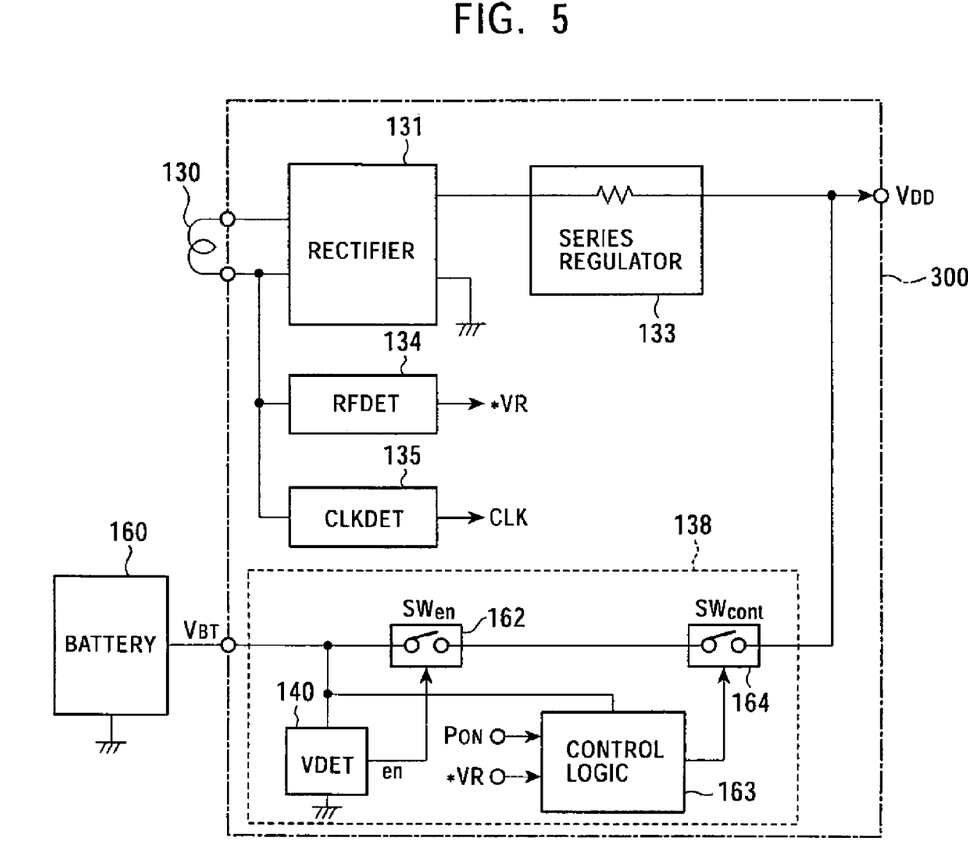
FIG. 5 shows a carrier-wave rectification circuit and a logic circuit of the cellular phone of the first embodiment of the present invention.

The switching of the power supplies of the cellular phone constructed as described above will be described below. FIG. 5 shows, in more detail, a carrier-wave rectification circuit and a logic circuit of the cellular phone of the first embodiment of the present invention. In FIG. 5, a carrier wave received by the antenna 130 is rectified by the rectifier 131, and this wave is supplied to the power-supply terminal VDD via the series regulator 133.

On the other hand, the output of the battery 160 is connected to the power-supply terminal VDD via the power-supply control circuit 138. This power-supply control circuit 138 is provided with a switch SWen 162 and a switch SWcont 164 between the input and the output. The switch SWen 162 is turned on/off in accordance with the control logic such as that shown in FIG. 6 by the power-supply voltage VBT of the battery 160. On the other hand, the switch SWcont 164 is turned on/off in accordance with the control logic such as that shown in FIG. 7 by the signal PON supplied externally and the signal VR supplied from the carrier-wave detector 134.

Figure 6:
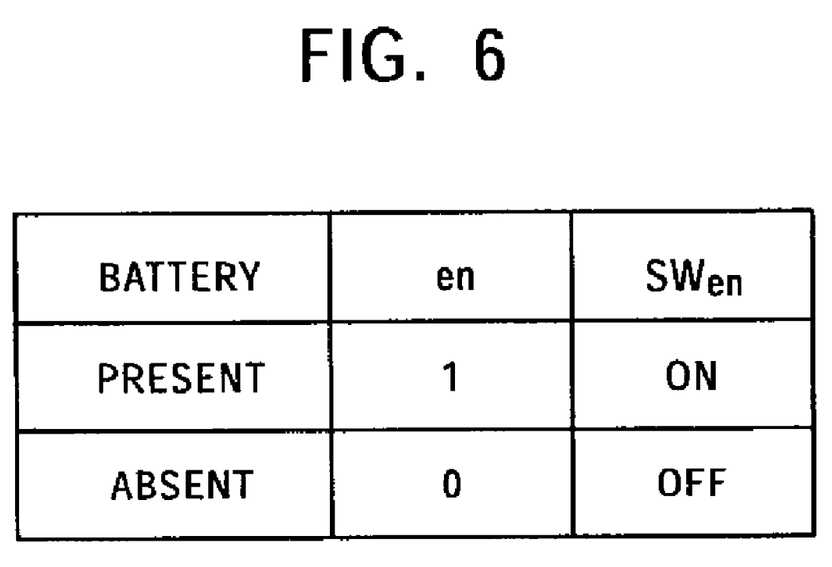
FIG. 6 illustrates control logic of a switch SWen of the first embodiment of the present invention.

FIG. 6 shows control logic for operating the switch SWen 162. As shown in FIG. 6, when the voltage VBT of the battery 160 is equal to or higher than a threshold value, an enable signal en (signal indicating "1") is output from the power-supply detector 140 (Vdet 140), and the switch SWen 162 is turned on by this signal. On the other hand, when the voltage VBT of the battery 160 is lower than the threshold value, an enable signal en is not output from the power-supply detector 140 (Vdet 140), and the switch SWen 162 is kept off.

Figure 7:
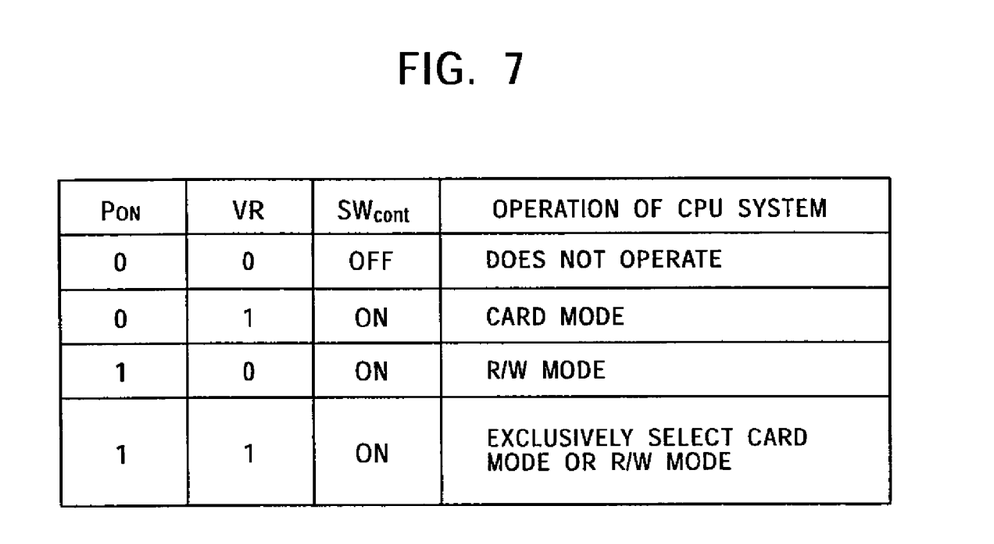
FIG. 7 illustrates control logic of a switch SWcont of the first embodiment of the present invention.

Meanwhile, FIG. 7 shows control logic for operating the switch SWcont 164. As shown in FIG. 7, the switch SWcont 164 becomes on when either of the signal PON and the signal VR is high ("1"), otherwise, the switch SWcont 164 is kept off. Here, the signal PON is a reader/writer mode signal. When a user instructs the cellular phone to perform a reading/writing operation, a high signal PON is output from the cellular phone. On the other hand, regarding the Signal VR, when a carrier wave is detected within the received radio wave by the carrier-wave detector 134, a high signal VR is output. That is, the signal VR being high indicates that the cellular phone (IC 300) operates in the card mode, and the signal PON being high indicates that the cellular phone operates in the reader/writer mode. The CPU 145 recognizes whether the cellular phone is operating in the card mode or in the reader/writer mode according to the signal VR or the signal PON. In FIG. 7, when both the signal VR and the signal PON are high, the control logic 163 exclusively selects one of the card mode and the reader/writer mode. This exclusive selection can be made in such a manner as to select in priority an operation of whichever becomes high earlier with respect to time. Of course, the selection may be made exclusively by another method.

The output of the switch SWcont 164 is connected to the output of the series regulator 133. Therefore, when both the switch SWen 162 and the switch SWcont 164 are on, the voltage VBT from the battery 160 is supplied as VDD. In the manner described above, the series regulator 133 is equivalently configured in such a manner as to control the internal impedance by the difference between the output voltage and a particular reference voltage. When the battery voltage is higher than the rectified voltage from the card (rectifier 131), generated by the series regulator 133, the internal impedance of the series regulator 133 becomes very large, and, thereby, the voltage of the battery 160 is prevented from flowing in reverse into the input side of the series regulator 133.

Even if a slight amount of electrical current flows in reverse into the input side of the series regulator 133 from the battery 160, the diode inside the rectifier 131 acts as a reverse bias, and the impedance is increased. Consequently, the reverse electrical current from the input side of the series regulator 133 to the rectifier 131 can be considerably decreased. On the other hand, when either of the switch SWen 162 and the switch SWcont 164 becomes off, the power from the battery 160 is not supplied as VDD, and only the rectified voltage of the carrier wave is supplied to the output of the series regulator 133, making it possible to seamlessly switch the power supplies without instantaneous power interruption. Furthermore, even when the distance to the external reader/writer device becomes relatively large and the power-supply voltage generated from the carrier wave cannot be sufficiently ensured, it becomes possible to perform communication by using power supplied from the battery 160. Therefore, it is possible to increase the distance in which communication is possible.

The circuits of FIGS. 3 and 5 can be realized by MOS processing, and all the circuits in FIGS. 3 and 5 can be disposed within a one-chip MOS LSI.

Second Embodiment

Figure 8:
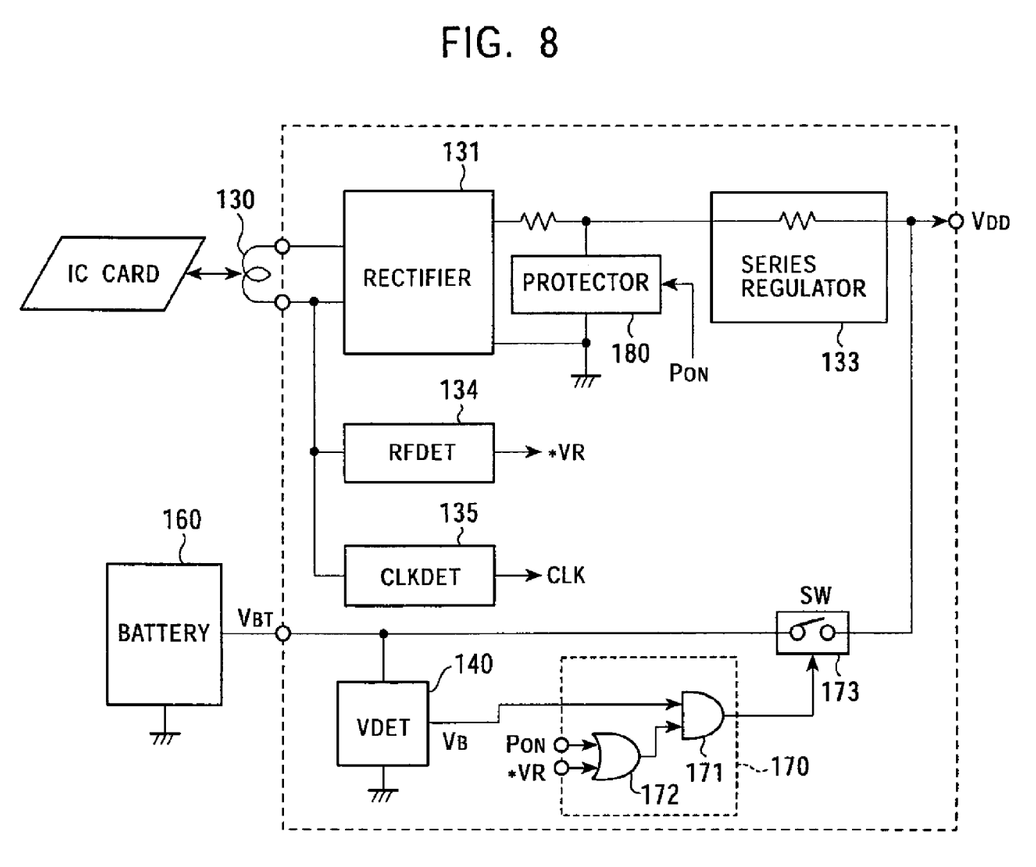
FIG. 8 shows a carrier-wave rectification circuit and a logic circuit of a cellular phone of a second embodiment of the present invention.

FIG. 8 shows a cellular phone having a card function and a reading/writing function according to a second embodiment of the present invention. FIG. 8 shows a modified circuit of FIG. 5, which differs particularly from the first embodiment in that a power-supply control circuit 170 and a protector 180 are provided.

A Vdet 140 monitors the output voltage of the battery 160. When the output voltage (battery voltage VBT) is lower than a predetermined value, a signal VB of a "0" level is output to an AND circuit 171 of the power-supply control circuit 170, and when the battery voltage VBT is higher than the threshold value, a signal VB of a "1" level is output to the AND circuit 171.

The power-supply control circuit 170 controls a switch SW 173 in accordance with the signal VB supplied from the Vdet 140, the signal PON indicating operation in the reader/writer mode, and a VR signal supplied from the carrier-wave detector 134 when a carrier wave is detected within the received radio wave.

Figure 9:
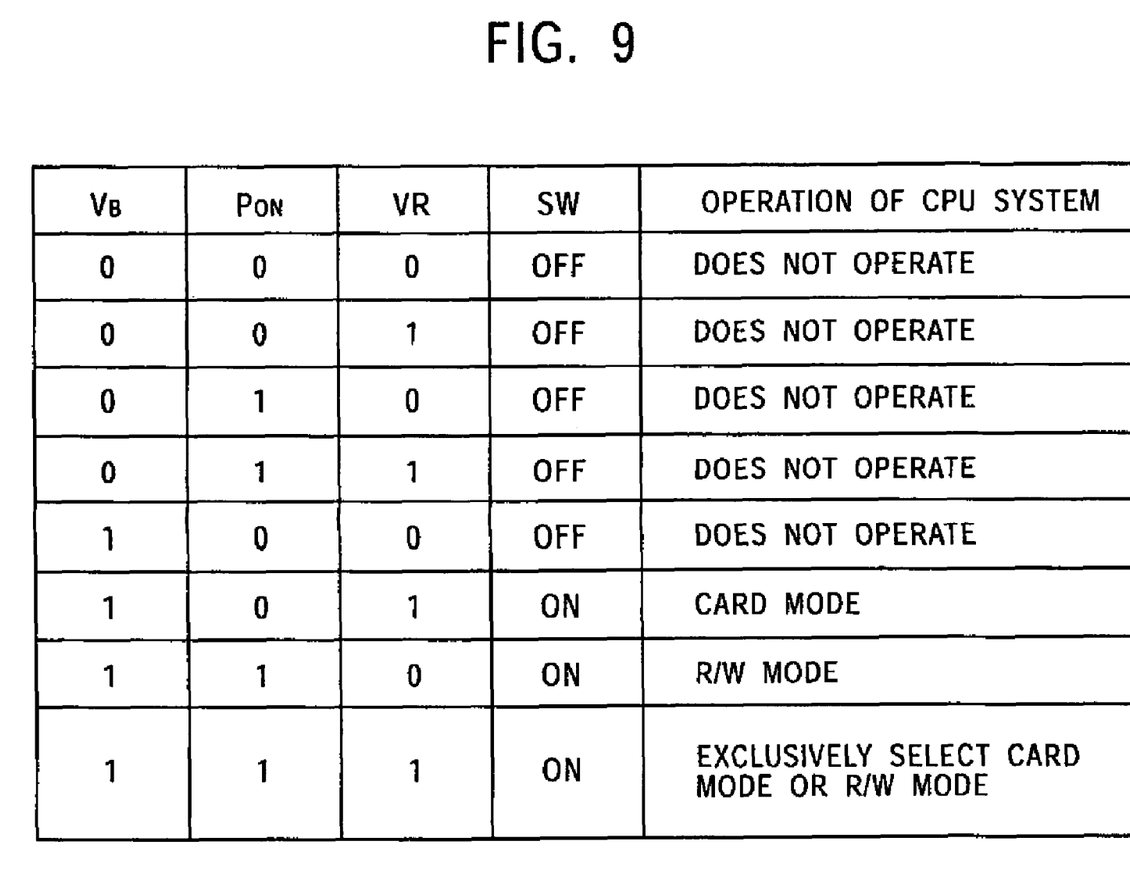
FIG. 9 illustrates control logic of a switch SW of the second embodiment of the present invention.

FIG. 9 shows control logic of the switch SW 173 by the power-supply control circuit 170. In FIG. 9, the signal Vb corresponds to the output voltage of the Vdet 140, becomes "0" when the battery voltage VBT is low, and becomes "1" when the battery voltage VBT is high. According to FIG. 9, the switch SW 173 is off while the battery voltage VBT is low (while the battery voltage VBT is equal to or lower than a threshold value), and is turned on when the battery voltage VBT becomes high (becomes equal to or higher than the threshold value) and when either of the signal PON and the signal VR is high. The card mode, the reader/writer mode, and the exclusive logic are the same as in the case of FIG. 5. That is, when either of the signal PON and the signal VR is high, the switch SW 173 is turned on.

The protector 180 is a circuit, formed by a MOS circuit, disposed on an IC chip. The protector 180 is connected between the connection point of the output of the rectifier 131 and the series regulator 133 and a ground, and is controlled in accordance with the reader/writer mode signal PON. Specifically, when the reader/writer mode signal PON is not applied (for example, when operating in the card mode), control is performed (the internal switch is turned on) so that the resistance of the protector 180 becomes very small, and an excessive voltage generated by the rectifier 131 in accordance with the carrier wave is output to the ground.

On the other hand, when the reader/writer mode signal PON is applied, the resistance of the inside of the protector 180 is made to be infinitely large (the internal switch is turned off), thereby preventing the supply of the leakage current by the series regulator 133 to the internal resistance of the protector 180.

The protector 180 is provided in this manner, and the protector 180 is turned off during the reader/writer mode (when the reader/writer mode signal PON is applied), making it possible to prevent loss of electrical current due to the leakage current of the series regulator 133, generated at a normal time (in particular, when realized by CMOS).

As a result, it is possible to form both the IC card and the reader/writer into one chip by MOS processing and possible to provide a cellular phone which realizes a low cost and high reliability of the product.

The above-mentioned "IC card" and "card function" are used for the sake of convenience in order to indicate a medium having a data carrying and processing function and a data carrying and processing function, respectively, and does not indicate the card shape. Although in the above-described embodiments, a case in which a semiconductor integrated-circuit device is incorporated within the cellular phone is described as an example, the present invention can be applied to a fixed phone connected by wire, a portable information terminal (PDA), which is a small information device, a watch, a computer, etc., regardless of the form thereof and the presence or absence of a wire/wireless communication function. Furthermore, the semiconductor integrated-circuit device may be incorporated within the portable terminal device in either a removable or an irremovable form, and an external storage medium, such as an IC card incorporating an IC or a memory card, may be formed in such a manner as to be removable from a cellular phone, a portable information terminal, a computer, etc.

INDUSTRIAL APPLICABILITY

As has thus been described, according to the present invention, since a semiconductor integrated-circuit capable of seamlessly switching between an external power supply and a carrier-wave rectified power supply can be realized, by incorporating the semiconductor integrated-circuit into various devices, it is possible to realize a device incorporating analog front-ends for both a card and an information processing apparatus such as a reader/writer. Furthermore, it becomes possible to use two communication interfaces of a wireless interface and a UART interface for the purpose of communication between a service memory compatible with a memory built in the semiconductor integrated-circuit and an external device. As a result, it becomes possible for the portable terminal device incorporating the semiconductor integrated-circuit in accordance with the present invention to operate as a remote IC card and to operate as a reader/writer for the remote IC card.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A semiconductor integrated-circuit device, comprising:
   rectifying means for rectifying a received carrier wave;
   generation means for generating a first power-supply voltage based on an output by the rectifying means; and
   selection means for selecting, as a power-supply voltage required for operation, one of the first power-supply voltage generated by the generation means and a supplied second power-supply voltage,
   wherein the selection means selects the first power-supply voltage as the power-supply voltage required for operation when the second power-supply voltage is lower than a threshold value, and the selection means selects the second power-supply voltage as the power-supply voltage required for operation when the second power-supply voltage is equal to or higher than the threshold value and an instruction to operate in accordance with a predetermined function is given.

2. A semiconductor integrated-circuit device according to claim 1, wherein when the second power-supply voltage is equal to or higher than the predetermined threshold value, the selection means selects the second power-supply voltage as the power-supply voltage required for operation when an instruction to operate in accordance with a data carrying and processing function for performing communication with an external information processing apparatus is given or when an instruction to operate in accordance with a function for performing communication with an external data carrying and processing medium is given.

3. A semiconductor integrated-circuit device according to claim 2, wherein a function section for realizing a data carrying and processing function and a function section for performing communication with an external data carrying and processing medium are formed on one chip.

4. A semiconductor integrated-circuit device according to claim 2, further comprising:
   control means, disposed between a connection point of the rectifying means and the generation means and a grounding point, for controlling switching of a switch in accordance with a signal instructing an operation in accordance with a function for performing communication with an external data carrying and processing medium,
   wherein the control means turns off the switch when the signal is supplied, and prevents an inflow of leakage current by the generation means, which occurs when the second power-supply voltage is selected as the power-supply voltage required for operation by the selection means.

5. A semiconductor integrated-circuit device according to claim 1, further comprising:
   clock signal extraction means for extracting a first clock signal based on the carrier wave;
   clock signal generation means for generating a second clock signal; and
   clock signal selection means for selecting, as a clock signal used as an operation reference, one of the first clock signal extracted by the clock extraction means and the second clock signal generated by the clock generation means,
   wherein the clock signal selection means selects the first clock signal as the clock signal used as the operation reference when the first clock signal is extracted by the clock signal extraction means, and selects the second clock signal as the clock signal used as the operation reference when the first clock signal is not extracted by the clock signal extraction means.

6. A portable terminal device, comprising:
a semiconductor integrated-circuit device, including:
rectifying means for rectifying a received carrier wave,
generation means for generating a first power-supply voltage based on an output by the rectifying means, and
selection means for selecting, as a power-supply voltage required for operation, one of the first power-supply voltage generated by the generation means and a supplied second power-supply voltage,
wherein the selection means selects the first power-supply voltage as the power-supply voltage required for operation when the second power-supply voltage is lower than a threshold value, and the selection means selects the second power-supply voltage as the power-supply voltage required for operation when the second power-supply voltage is equal to or higher than the threshold value and an instruction to operate in accordance with a predetermined function is given.

7. A semiconductor integrated-circuit device, comprising:
a rectifying unit that rectifies a received carrier wave;
a generation unit that generates a first power-supply voltage based on an output by the rectifying unit; and
a selection unit that selects, as a power-supply voltage required for operation, one of the first power-supply voltage generated by the generation unit and a supplied second power-supply voltage,
wherein the selection unit selects the first power-supply voltage as the power-supply voltage required for operation when the second power-supply voltage is lower than a threshold value, and the selection unit selects the second power-supply voltage as the power-supply voltage required for operation when the second power-supply voltage is equal to or higher than the threshold value and an instruction to operate in accordance with a predetermined function is given.

8. A semiconductor integrated-circuit device according to claim 7, wherein when the second power-supply voltage is equal to or higher than the predetermined threshold value, the selection unit selects the second power-supply voltage as the power-supply voltage required for operation when an instruction to operate in accordance with a data carrying and processing function that performs communication with an external information processing apparatus is given or when an instruction to operate in accordance with a function that performs communication with an external data carrying and processing medium is given.

9. A semiconductor integrated-circuit device according to claim 8, wherein a function section that realizes data carrying and processing and a function section that performs communication with an external data carrying and processing medium are formed on one chip.

10. A semiconductor integrated-circuit device according to claim 8, further comprising:
a control unit, disposed between a connection point of the rectifying unit and the generation unit and a grounding point, that controls switching of a switch in accordance with a signal instructing an operation in accordance with a function that performs communication with an external data carrying and processing medium,
wherein the control unit turns off the switch when the signal is supplied, and prevents an inflow of leakage current by the generation unit, which occurs when the second power-supply voltage is selected as the power-supply voltage required for operation by the selection unit.

11. A semiconductor integrated-circuit device according to claim 7, further comprising:
a clock signal extraction unit that extracts a first clock signal based on the carrier wave;
a clock signal generation unit that generates a second clock signal; and
a clock signal selection unit that selects, as a clock signal used as an operation reference, one of the first clock signal extracted by the clock extraction unit and the second clock signal generated by the clock generation unit,
wherein the clock signal selection unit selects the first clock signal as the clock signal used as the operation reference when the first clock signal is extracted by the clock signal extraction unit, and selects the second clock signal as the clock signal used as the operation reference when the first clock signal is not extracted by the clock signal extraction unit.

12. A portable terminal device, comprising:
a semiconductor integrated-circuit device, including:
a rectifying unit that rectifies a received carrier wave,
a generation unit that generates a first power-supply voltage based on an output by the rectifying unit, and
a selection unit that selects, as a power-supply voltage required for operation, one of the first power-supply voltage generated by the generation unit and a supplied second power-supply voltage,
wherein the selection unit selects the first power-supply voltage as the power-supply voltage required for operation when the second power-supply voltage is lower than a threshold value, and the selection unit selects the second power-supply voltage as the power-supply voltage required for operation when the second power-supply voltage is equal to or higher than the threshold value and an instruction to operate in accordance with a predetermined function is given.

* * * * *